United States Patent [19]

Gluska et al.

[11] Patent Number: 5,592,674

[45] Date of Patent: Jan. 7, 1997

[54] AUTOMATIC VERIFICATION OF EXTERNAL INTERRUPTS

[75] Inventors: Alon Gluska, Kiriat Yam; Laurent Fournier, Givat Elah; Raanan Gewirtzman, Haifa; Reuven Nisser, Kiriyat Byalik, all of Israel

[73] Assignee: International Business Machines Corporation, Armonk, N.Y.

[21] Appl. No.: 359,810

[22] Filed: Dec. 20, 1994

[51] Int. Cl.⁶ .............................. G06F 9/455; G06F 9/46
[52] U.S. Cl. ........................ 395/742; 371/27; 395/500
[58] Field of Search ................................... 395/735, 742, 395/733, 739, 183.06, 183.01, 500; 364/579, 580; 371/27

[56] References Cited

U.S. PATENT DOCUMENTS

| | | |
|---|---|---|
| 4,636,941 | 1/1987 | Suko . |
| 4,891,773 | 1/1990 | Ooe et al. . |
| 4,899,306 | 2/1990 | Greer . |
| 5,193,195 | 3/1993 | Miyazaki . |
| 5,202,889 | 4/1993 | Aharon et al. . |
| 5,247,628 | 9/1993 | Grohoski . |
| 5,301,312 | 4/1994 | Christopher, Jr. et al. . |
| 5,313,468 | 5/1994 | Hoshi et al. . |

Primary Examiner—Jack B. Harvey
Assistant Examiner—Glenn A. Auve
Attorney, Agent, or Firm—Whitham, Curtis, Whitham & McGinn; Susan M. Murray

[57] ABSTRACT

A method for the automatic verification of external interrupts in modern processor architectures under a very wide range of instruction sequences provides almost complete expected results from each of the involved interrupts. In particular, the method allows the verification of the architectural aspects to the external interrupt mechanism in pipelined and super scalar microprocessors. The method which is based on the assumption that when an external interrupt is serviced, the processor branches to a specific address according to the type of the external interrupt. The first step in the method is a preparation step wherein the memory addresses already used by the test are scanned and unused memory spaces are allocated for a plurality of memory blocks and two memory addresses for pointers. These two addresses are used to find the next block to fill. After this initial preparation step, the interrupt is presented in any desired location by the design simulator controller. Next, the instruction range in which the external interrupt could be serviced is found. External interrupt routines are added to the test. These routines are executed each time the appropriate external interrupt is served by the processor. Finally, the reference model of the processor is used to recompute the expected results of the test. In this process, each external interrupt will update its unique block of memory and, as a result, if the processor sets any of these resources to an incorrect value while servicing any of the external interrupts presented in the test, it will be detected as the actual results of the test will be different than those expected in the test program. A mask is used to detect latency violations. The value saved in memory is independent of the actual timing of the interrupt since all the unknown bits are reset by the mask. By using an offset, the chances of detection of a latency violation are improved.

9 Claims, 4 Drawing Sheets

AUTOMATIC VERIFICATION OF EXTERNAL INTERRUPTS

BACKGROUND OF THE INVENTION

1. Field of the Invention

The present invention generally relates to a process of generating test patterns for the functional verification of integrated circuit hardware designs and, more particularly, to testing external interrupts of a pipelined or super scalar processor wherein multiple instructions are loaded simultaneously for pipelined and/or simultaneous processing.

2. Description of the Prior Art

The present invention is an improvement on the process disclosed in U.S. Pat. No. 5,202,889 to Aharon et al. and assigned to a common assignee with this application. That patent discloses a dynamic process for the generation of biased pseudo-random test patterns for the functional verification of hardware designs. Verification is performed by executing the test patterns on a design model in a sequence of steps. While the process in the Aharon et al. patent is effective for most integrated circuit testing, modern microprocessor design present some problems due to their complex designs.

Processor architectures allow for external interrupts. When a external interrupt is presented, the processor serves the interrupt by stopping the execution of its current instruction stream and branching to a predefined address, from which execution resumes. The processor also allows the software to return from the interrupt; i.e., to branch back and continue execution of its original instruction stream.

External interrupts are asynchronous; that is, they can be presented to the processor at any time. In addition, the latest microprocessor designs are pipelined and super scalar processors in which instructions may be executed out of their original order. When an external interrupt is presented, the processor may first complete the execution of the instructions which have already been fetched or which are in some stages of execution before it serves the interrupt.

Verification of processor behavior is carried out by simulation of test programs. Such test programs can be generated automatically by test generation tools such as Random Test Program Generators (RTPGs), which generate tests very efficiently. These generators also use reference models of the processor architecture to predict the expected results of the test after execution of its instructions. The test programs are run through a model of the design realization, which is referred to as the design simulator, and the actual results of the tests are compared against those predicted in the tests.

Automatic test generation tools, such as RTPGs, use reference models of the processor in order to predict the results of the tests they generate. For practical reasons, these models are based on the functional specification of the processor as defined in its architecture book and lack the specific knowledge of the internal states and actual timing. Such reference models cannot precisely predict when the external interrupt presented to the processor may happen. As a result, in tests which present external interrupts to the processor, the results may be unpredictable.

The alternative methods for automatic test generation are very inefficient. Therefore, it is important to solve the unpredictable result problem. This may be simply done by one of the following solutions:

1. Build the test in such a way that the precise location of the interrupt service has no effect on the test results. For example, only no-op instructions are incorporated in the range where the interrupt is expected to be serviced.

2. Add instructions to the test which override the resources with unknown values.

These two solutions alone provide poor verification. The first limits significantly the scope of the tests where an external interrupt may be presented to the processor. In the verification process, any function should be tested under a range of conditions as wide as possible. The second solution causes resources which are set by the external interrupt mechanism to be masked and, as a result, if any of them is set to an incorrect value, it will not be reflected by incorrect results of the test.

SUMMARY OF THE INVENTION

It is therefore an object of the present invention to provide a method for the automatic verification of external interrupts in modern processor architectures under a very wide range of instruction sequences, while providing almost complete expected results from each of the involved interrupts.

It is another object of the invention to provide a method that allows the verification of the architectural aspects to the external interrupt mechanism in pipelined and super scalar microprocessors.

According to the invention, there is provided a method which is based on the assumption that when an external interrupt is serviced, the processor branches to a specific address according to the type of the external interrupt. The first step in the method is a preparation step wherein the memory addresses already used by the test are scanned and unused memory spaces are allocated for a plurality of memory blocks and two memory addresses for pointers. These two addresses are used to find the next block to fill. After this initial preparation step, the interrupt is presented in any desired location by the design simulator controller. Next, the instruction range in which the external interrupt could be serviced is found. External interrupt routines are added to the test. These routines are executed each time the appropriate external interrupt is served by the processor. Finally, the reference model of the processor is used to recompute the expected results of the test. In this process, each external interrupt will update its unique block of memory and, as a result, if the processor sets any of these resources to an incorrect value while servicing any of the external interrupts presented in the test, it will be detected as the actual results of the test will be different than those expected in the test program. A mask is used to detect latency violations. The value saved in memory is independent of the actual timing of the interrupt since all the unknown bits are reset by the mask. By using an offset, the chances of detection of a latency violation are improved.

The method according to the invention is generic and independent of microprocessor architecture. The method is a very efficient solution for the verification of some aspects of the external interrupt mechanism in most modern microprocessor architectures. The method allows an automatic generation of test programs with external interrupts, which is very fast, without compromising the testing quality.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
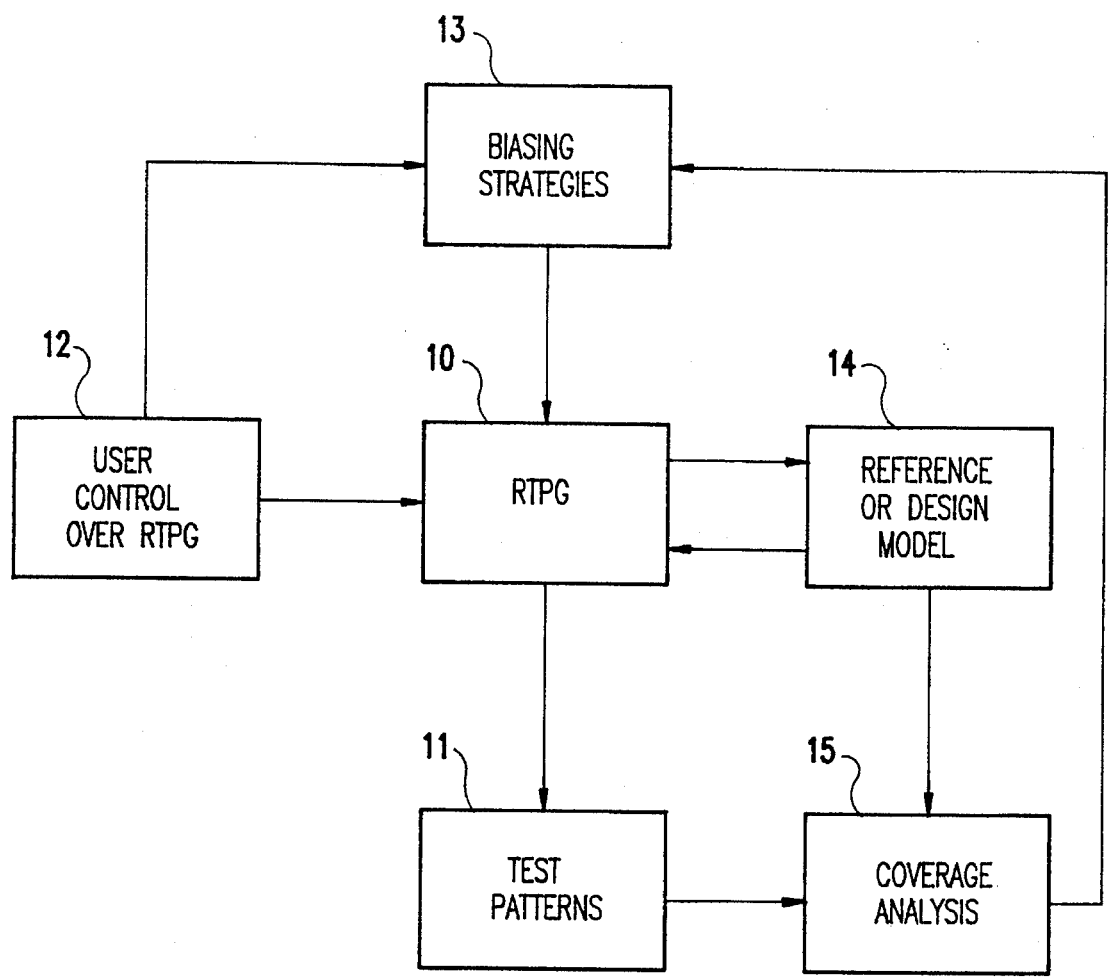
FIG. 1 is a block diagram showing the general organization of units involved in the dynamic generation of pseudo-random test patterns used to test microprocessors according to the principles of the invention.

Referring now to the drawings, and more particularly to FIG. 1, there is shown a representation of the units involved in the dynamic generation of pseudo-random test patterns. The heart of the system is a Random Test Program Generator (RTPG) 10 which generates test patterns 11 for the test of external interrupt handling of microprocessors. The user 12 controls the process at the front end which is implemented as a set of screens allowing the initialization of the most crucial parameters of the process. Usually, these parameters control the selection among biasing strategies 13, set the contents of the machine state register and set memory limits in the RTPG 10, and the like. The RTPG 10 executes an instruction using the reference or design model 14. After execution of the instruction, all involved facilities are updated. These facilities are marked as containing the test pattern result. The coverage analysis 15, which receives outputs from the test patterns 11 and the reference or design model 14, determines whether more instructions are to be generated. If so, the biasing strategies 13 are dynamically modified; otherwise, the generation of the test pattern is completed.

Generally, the test patterns produced by the RTPG 10 consists of three parts:

1. Initialization, which before a test actually starts, defines values of all facilities involved in the test up to certain states as required by the test pattern. Only those facilities which have explicit or implicit influence on the execution of the test are to be initialized.
2. Execution, which drives the simulation of the design during one or more steps (e.g., machine cycles). In certain cases, the execution part might be included in the initialization part. For example, the execution part can be specified by proper initialization of the instruction memory, instruction address register and termination point.
3. Result, which provides the final values of the facilities which have been changed during execution of the test.

The invention solves three generic problems which have a broad scope. These are listed and discussed briefly below:

1. How can a reference model of the processor, such as that used by automatic test program generators, predict accurate expected results when an event, such as an external interrupt, occurs asynchronously during the execution of an instruction stream? When the external interrupt is presented to the pipelined processor, some instructions (up to a few dozen) may have been already fetched. The processor can complete the execution of any portion of these instructions before serving the interrupt. Therefore, there is no apriori knowledge of the last instruction executed before the processor branches to serve the interrupt, but rather a range of instructions. Although the processor will execute the same instructions, they may be executed in different orders depending on the exact location of the interrupt in the range. It is clear that different orders of execution, even of the same instructions, generally induce different final results.
2. Another generic problem appears when multiple external interrupts are to be serviced. A reflection of each of the external interrupts is needed at the expected results of the test. If the test is given, the only code which can provide these traces is the interrupt handler code. Although the same code may be executed for every interrupt of the appropriate type, it should provide traces which are saved in unique locations so that a subsequent execution will not cover the results of the previous one. These traces, which gather some identifying information for each occurring interrupt, are necessary for giving a means to keep track of the external interrupts which have happened during the test program.
3. The third generic problem is concerned with the way to give confidence that the external event has indeed taken place in some predictable range. Specifically, for the case of external interrupt, it means that the interrupt location is indeed inside the predicted range of instructions. A violation should be observable; i.e., reflected by incorrect results of the test.

Figure 2:
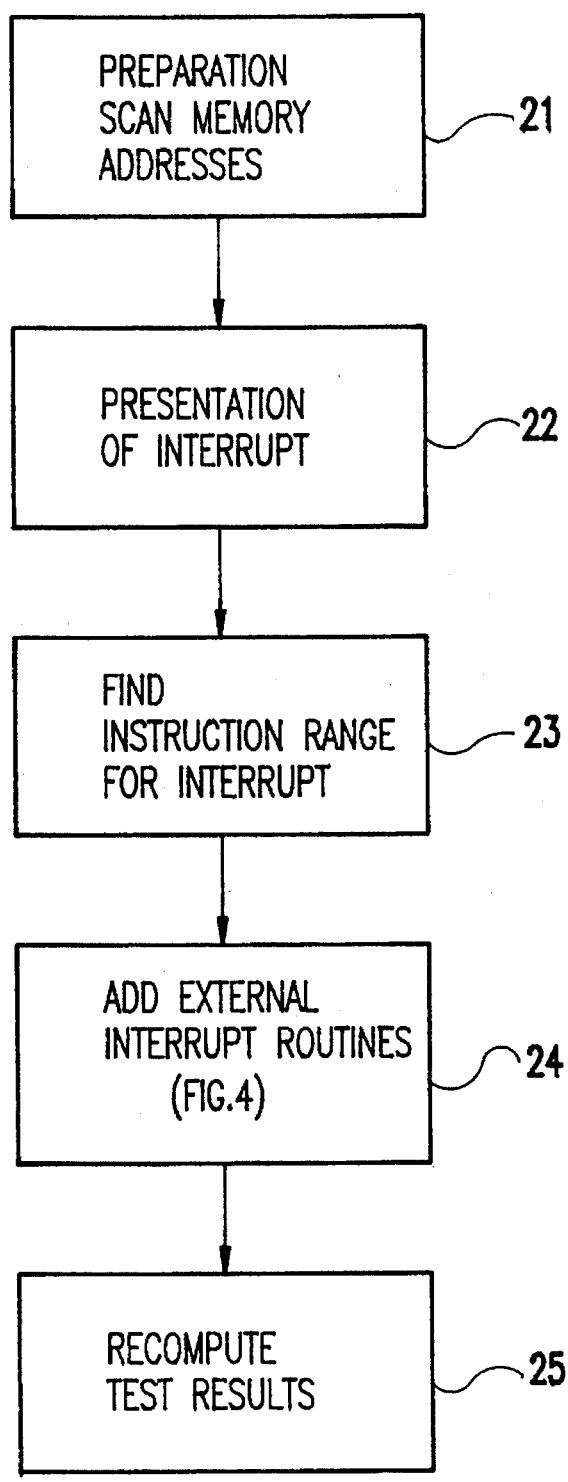
FIG. 2 is a flow diagram showing the steps of the method according to the invention.

The method according to the invention is illustrated by the flow diagram of FIG. 2 and consists of five steps which allow adding the external interrupt testing into existing test programs. In the practice of the invention, it is assumed that as the external interrupt is serviced, the processor branches to a specific address according to the type of the external interrupt. This assumption is satisfied for some leading microprocessor architectures such as the X86 family of microprocessors from Intel and PowerPC® microprocessors jointly developed by Motorola and International Business Machines.

The first step 21 is a preparation step in which the memory addresses are scanned for those addresses already used by the test. The unused memory spaces are allocated for n memory blocks of size m memory words each, where n is the number of external interrupts which will be presented in the test and m is a sufficient number of words to hold all the resources to be stored plus one pointer, and two memory addresses having the size of a pointer.

Figure 3:
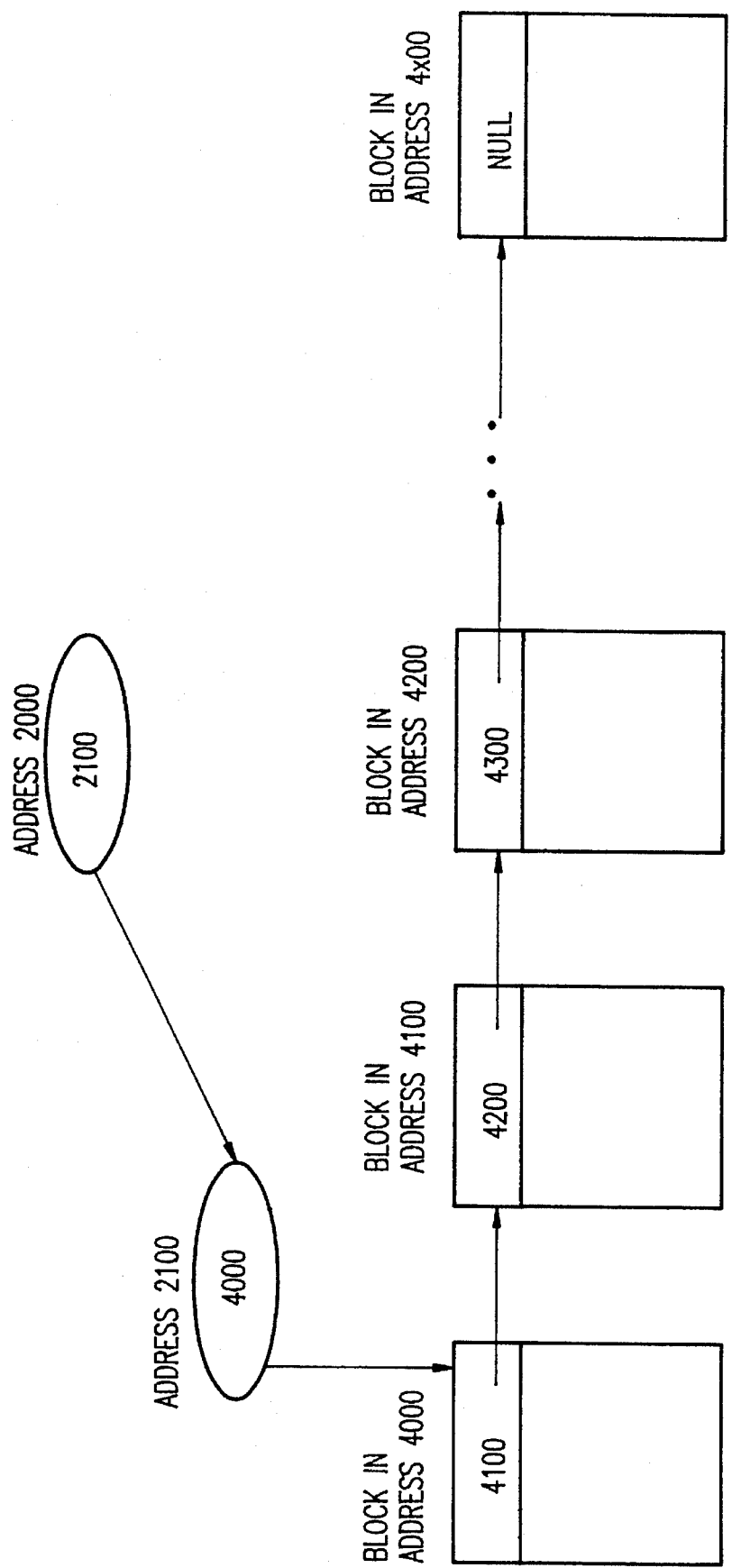
FIG. 3 is a block diagram showing the relation of memory blocks and pointers as used in a specific embodiment of the invention.

In the specific example shown in FIG. 3, it is assumed that the memory blocks are allocated in address 4000, 4100, 4200, etc. and that the two memory addresses are 2000 and 2100. These two addresses will let us find the next block to fill. Address 2000 will always point to the pointer to the next block, and address 2100 will point to the first block. As the memory space supported by the latest (or modern) processors is huge relative to the size of practical test programs, we can safely assume that such memory spaces are always available.

Referring again to FIG. 2 and with continued reference to FIG. 3, the initial values of the allocated spaces are set in step 21. Address 2100 will point to the first block 4000, address 2000 will point to the pointer to the next block 2100, and the first word in each of the blocks will point to the next block (e.g., first word of block 4000 will hold 4100, first word of 4100 will hold 4200, etc.), as illustrated in FIG. 3. For each of the n external interrupts presented in the test, the following steps are performed, as shown in FIG. 2.

In step 22, the interrupt is presented in any desired location. The design simulator controller will present an external interrupt at the appropriate simulation cycle.

In step 23, the instruction range where the interrupt is expected to be service is found. In this step, a check is made to determine that the external interrupt is not masked off within the range, and a check is made to make sure the range does not overlap any range of another external interrupt presented so far in the test. There may be a few problematic instructions which should not be present in the range; e.g., an instruction modifying the context under which instructions are executed. If any of these conditions are not met, the presentation of the current interrupt is canceled.

The size of the instruction range is usually limited by the maximal number of instructions which can be fetched into the processor at any moment. The processor may shrink the range or flush it all with the occurrence of certain events; e.g., internal interrupts and branches. The addresses in the range are compared to determine which bits hold the same values in all of them. According to the outcome of the comparison, an address bit mask is built. This mask holds "1s" in all those bits, and "0s" elsewhere. The mask is saved and used later by the interrupt handler for the detection of latency violations.

A slight improvement can be achieved by using an offset as well. In this case, the offset is first subtracted from each of the addresses of the range, prior to the mask computation, and another word in the block is set to the offset value. The offset will have to be calculated in such a way that its deduction from all the addresses in the range will cause a maximum number of bits to be in common in the obtained addresses. A rule of thumb for the offset value can be the value of the first address in the range. Both the mask and the offset will be used for the detection of latency violations.

Figure 4:
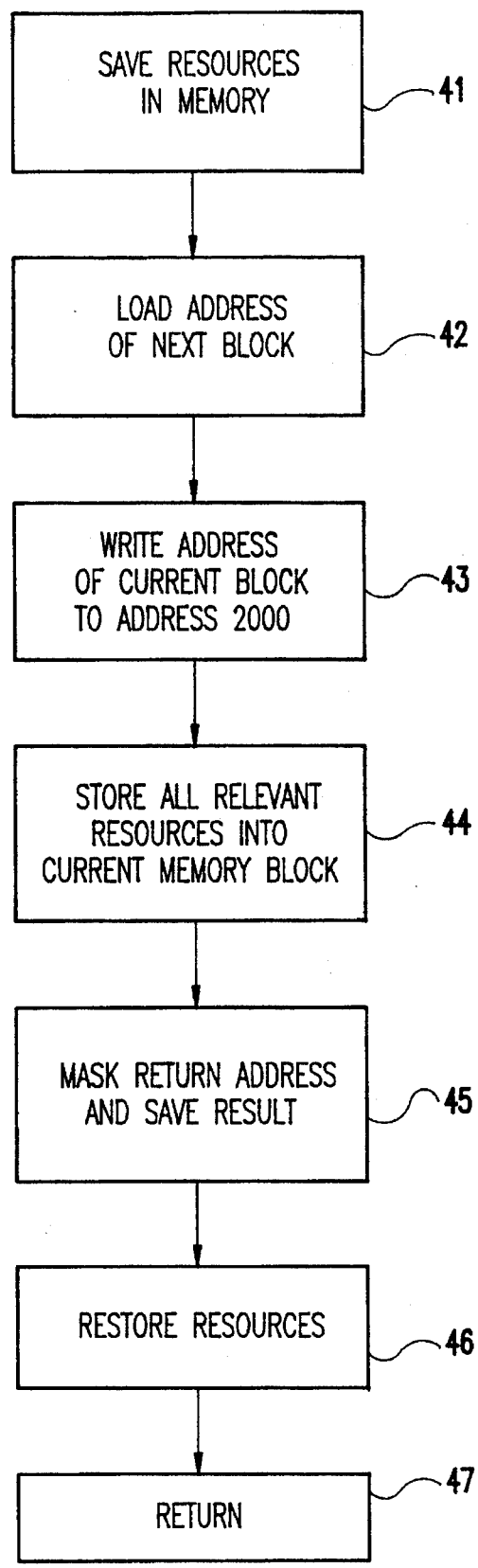
FIG. 4 is a flow diagram showing the structure of the external interrupt routine.

In step 24 shown in FIG. 2, the interrupt routines are added to the test. If the routines cannot fit into unused memory addresses, the test cannot be used. These routines will be executed each time the appropriate external interrupt is served by the processor. The external interrupt routine is of the structure shown in FIG. 4, to which reference is now made.

The first step 41 is to save in memory the resources which will be altered during the execution of the interrupt routine. The saving addresses in memory will be such that they are not used by the test, and they will not be considered a part of the test final results.

The second step 42 is to load the address of the next block through address 2000 (which always points to the address of the next block). This block will become the current block.

The third step 43 is to write the address of the current block into address 2000 (keep coherency for the next interrupt, as the first word on the current block points to the next block).

The fourth step 44 is to store all the resources having a significant role in the external interrupt mechanism into the current memory block. Along with the masked address, they will yield some kind of identifying signature for each of the interrupts.

The fifth step 45 is to load the mask from the block. Apply a binary AND operation between the return address (the address in which execution resumes upon return from interrupt) and the mask. In case an offset is used, load it from the block, and subtract it first from the return address. Save the result in the block as well.

In step 46, the resources are restored to their values saved in step 41. Finally, in step 47, a return is made from the interrupt.

Referring again to FIG. 2, the final step 25 is to recompute the test results.. This is done using the reference model of the processor. The simulator can assume that each of the external interrupts presented in the test is served at an arbitrary point along the expected range; e.g., at the last possible address. The reference model 14 (FIG. 1) should avoid the propagation of undefined resources, such as the resources which hold the return addresses. In case such a propagation occurs, the test is not used. These resources will not be part of the expected results unless they are overwritten through the execution of later instructions.

As a result of the described method, each external interrupt will update its unique block in memory. The values of the resources involved in the interrupt mechanism will be saved into unique memory location. As a result, if the processor sets any of these resources to an incorrect value while servicing any of the external interrupts presented in the test, it will be detected as the actual results of the test will be different than those expected in the test program.

The mask used allows the detection of latency violations. The value saved in memory is independent on the actual timing of the interrupt, as all the unknown bits are reset by the mask. Therefore, if the interrupt is served by the implementations outside the expected range, the actual value saved in memory may be different than the expected result, and the violation will be caught.

As an example, suppose that an external interrupt is expected to be served in the following binary range: 11010011, 11010100, 11010101, 11010110. The appropriate mask for this range is 11111000, as the first five bits are known, while the last three are not. The value which will be saved by the behavioral simulator will therefore be 11010000.

If the actual service address is, for instance, 11011000, the result of the AND operation will be 11011000. As this value is kept by the processor in a unique address in memory, the actual results of the test programs will be different than the expected results. In this example, the simulator claims that the value in memory should be 11010000, while the actual result is 11011000. Therefore, the violation is detected.

As mentioned, the use of an offset can improve the chances of detection of latency violation. In the previous example, if the service address is 11010111, the violation is not detected as the AND result is the same as with using any of the addresses in the range. However, if the offset value is 11010011, the corresponding mask is 11111100, and every violation is detected.

The method according to the invention yields a general embedded solution for automatic generation of test programs for the verification of the external interrupt implementation. The solution introduces guidelines for coding an interrupt handler for external interrupts and combining the generation process with the handler simulation.

The accuracy problem is solved by saving and restoring, in the interrupt routine code, the resources which are used by the handler itself. Tracing the interrupts which have occurred is enabled by the linked list of memory blocks. This offers a reliable means for the detection of any resource setting violation. Lastly, the range latency problem is resolved by using the mask. It can be argued that the mechanism may still fail to detect some erroneous latencies, in particular when long branches occur during the range. Indeed, in such cases, the mask might be stripped of any relevant information. However, this problem can be solved by creating and storing a list of masks in a way similar to the one used for the case of memory addresses.

The method according to the invention has two important generic properties. On the one hand, it assures soundness by guaranteeing accuracy of the predicted results. However, one should keep in mind that soundness alone could have been easily achieved by, say, forcing the ranges to include only instructions which have not effect (no-ops, for example). Thus, soundness is valuable only when it is combined with another property; i.e., sensitivity. The method according to the invention also process this property since the range of instructions is by no means restricted (except for the minor exceptions mentioned above), thereby leaving full verification power to the program created.

Besides solving the problems previously described, the method according to the invention possesses additional advantages. The efficiency of the testing process is improved because the overhead added by the method is negligible. The interrupts can be easily traced, and the order they occurred is determined through the memory block links. Detectable violations include incorrect setting of the interrupt resources, an expected interrupt was not taken, and an unexpected interrupt was taken. There is almost no restriction on the type of the instructions which can appear during the latency range. This fact is important since verifying the good functionality of the external interrupt mechanism usually requires checking their occurrence under a range of instructions as wide as possible.

The invention introduces a comprehensive method for verifying external interrupt mechanisms which is effective for modern pipelined and super scalar microprocessor architectures. The method according to the invention combines several desired properties which makes if far more attractive than any other existing technique. The method allies soundness and sensitivity yet is architecture independent. The method can be applied to automatic test generation in a very efficient manner.

While the invention has been described in terms of a single preferred embodiment employing the RTPG approach, those skilled in the art will recognize that the invention can be practiced with modification within the spirit and scope of the appended claims. More specifically, the method according to the invention can be used with other means to generate the input test pattern, to which the external interrupt knowledge is added.

Having thus described our invention, what we claim as new and desire to secure by Letters Patent is as follows:

1. In a dynamic process for generating biased pseudo-random test patterns for the functional verification of hardware designs using reference models, a method for adding to a test pattern the automatic verification of external interrupts in pipelined and super-scalar processors under a very wide range of instruction sequences, wherein at the time each said interrupt is presented said processor will have fetched a first plurality of instructions, an unknown number of which may be executed prior to servicing said interrupt, the sequence and timing of said execution being unknown to said reference model, each said interrupt being one of a plurality of types, said microprocessor upon servicing said interrupt branching to a specific address according to said type, comprising the steps of:

identifying a second plurality of external interrupts to be verified;

scanning memory addresses for those addresses already used by a test and allocating unused memory spaces for a third plurality of memory blocks and two memory addresses for pointers;

presenting an interrupt of said second plurality of interrupts at any desired location in a test sequence of instructions, said location being determined by a design simulator controller;

finding an instruction range within said test sequence of instructions in which each said presented interrupt could be serviced, said instruction range corresponding to said first plurality of instructions;

adding external interrupt routines to the test for each said type of said second plurality of interrupts, said routines being executed each time an external interrupt of said type is serviced by said processor;

servicing said second plurality of external interrupts during an execution of said test sequence of instructions; and recomputing said test sequence using said reference model of said processor, thereby producing test results which can be compared to results of said execution of said test sequence.

2. The method recited in claim 1 wherein the step of identifying a second plurality of external interrupts comprises the steps of:

determining that each interrupt in said second plurality is not masked off by an instruction within said respective instruction range;

checking to be sure that a respective instruction range for an interrupt does not overlap the respective instruction range for any other interrupt within said second plurality of interrupts;

identifying the presence, within a respective instruction range, of a problematic instruction; and canceling the presentation of an interrupt failing any of said determining, checking or identifying steps.

3. The method recited in claim 2 wherein said memory blocks form a linked list, said two addresses being used to find a next block in said linked list to fill, said third plurality being equal to or greater than said second plurality.

4. The method recited in claim 3 wherein the step of recomputing comprises the further steps of using a reference model of the processor to recompute results of said test, whereby each external interrupt will update a distinct one of said third plurality of memory blocks and, as a result, if the processor sets any of the blocks of memory to an incorrect value while servicing any of the external interrupts presented in the test, the incorrect value will be detected as the actual results of the test will be different than those expected in the reference model; and determining whether detected said interrupts have been serviced within said respective instruction ranges.

5. The method recited in claim 4 further comprising the step of using a mask to detect whether an interrupt has been serviced within said instruction range, said mask having "1s" in bit locations where all addresses within said instruction range have the same value and "0s" otherwise.

6. The method recited in claim 5 further comprising the step of using an offset to improve chances of detection of whether an interrupt has been serviced within said instruction range.

7. The method recited in claim 5 wherein the step of adding external interrupt routines comprises the steps of:

saving in memory resources which will be altered during execution of an interrupt routine;

loading an address of a next block at a pointer which points to a current block, making the next block the current block;

writing an address of the current block at an address which provides coherency for a next interrupt;

storing all resources having a significant role in the external interrupt mechanism into the current memory block;

loading the mask from the current memory block and applying a binary AND operation between a return address and the mask; and restoring the memory resources saved prior to execution of an interrupt routine.

8. Apparatus for automatic verification of external interrupts in a processor under a very wide range of instruction sequences comprising:

scanning means for scanning memory addresses for those addresses already using by a test and allocating unused memory spaces for a plurality of memory blocks and two memory addresses for pointers, each of said external interrupts having a distinct one of said memory blocks, said two addresses being used to find a next block to fill;

design simulator controller means responsive to said scanning means for presenting an interrupt in any desired location within a test sequence of instructions and finding an instruction range within said test sequence in which an external interrupt could be serviced;

means responsive to said design simulator controller for adding external interrupt routines to the test, said routines being executed each time an external interrupt is served by the processor; and computation means including a reference model of the processor for recomputing expected results of the test with the added external interrupt routines whereby each external interrupt will update its distinct one of said memory blocks and, as a result, if the processor sets any of these resources to an incorrect value while servicing any of the external interrupts presented in the test, it will be detected as the actual results of the test will be different than the results computed using said reference model.

9. The apparatus of claim 8 wherein said means for adding external interrupt routines to the test includes:

means for saving in said distinct memory block all memory resources which will be altered during execution of an interrupt routine;

means for loading an address of a next block at a pointer which points to a current block, making the next block the current block;

means for writing an address of the current block at an address which provides coherency for a next interrupt;

means for constructing a mask for comparing instructions within said instruction range and storing said mask in said memory block;

means for loading said mask from the block and applying a binary AND operation between a return address and the mask; and means for restoring the memory resources saved prior to execution of an interrupt routine.

* * * * *